US012739734B2

(12) United States Patent
Pezeshki et al.

(10) Patent No.: US 12,739,734 B2
(45) Date of Patent: Sep. 15, 2026

(54) TECHNIQUES FOR SURROUNDING INFORMATION INDICATION

(71) Applicant: QUALCOMM Incorporated, San Diego, CA (US)

(72) Inventors: Hamed Pezeshki, San Diego, CA (US); Tao Luo, San Diego, CA (US); Mahmoud Taherzadeh Boroujeni, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 697 days.

(21) Appl. No.: 17/552,121

(22) Filed: Dec. 15, 2021

(65) Prior Publication Data

US 2023/0189126 A1 Jun. 15, 2023

(51) Int. Cl.

| | |
|---|---|
| ***H04W 48/12*** | (2009.01) |
| ***H04W 4/02*** | (2018.01) |
| ***H04W 4/021*** | (2018.01) |
| ***H04W 4/029*** | (2018.01) |
| ***H04W 64/00*** | (2009.01) |

(52) U.S. Cl.

CPC ........... *H04W 48/12* (2013.01); *H04W 4/021* (2013.01); *H04W 4/025* (2013.01); *H04W 4/029* (2018.02); *H04W 64/00* (2013.01)

(58) Field of Classification Search

CPC ..... H04W 48/12; H04W 4/025; H04W 4/021; H04W 4/029; H04W 64/00

See application file for complete search history.

(56) References Cited

U.S. PATENT DOCUMENTS

2011/0013560 A1* 1/2011 Zhang .................. H04B 1/1027 370/328
2012/0149351 A1* 6/2012 Kalbag ................. H04W 48/08 455/418
2016/0021595 A1* 1/2016 Czaja ................ H04W 36/0055 455/440

(Continued)

FOREIGN PATENT DOCUMENTS

CN 113099529 A * 7/2021 ............ H04W 64/00
KR 19980074411 A * 11/1998
KR 20170073507 A 6/2017

OTHER PUBLICATIONS

International Search Report and Written Opinion—PCT/US2022/047903—ISA/EPO—Feb. 9, 2023 (2106870WO).

*Primary Examiner* — Muthuswamy G Manoharan
(74) *Attorney, Agent, or Firm* — Holland & Hart LLP

(57) ABSTRACT

Methods, systems, and devices for wireless communication at a user equipment (UE) are described. A UE may receive, from a base station, signaling including information associated with a surrounding in which the UE is located. In some examples, the information associated with the surrounding in which the UE is located may be determined via a sensor coupled with the base station. For example, the UE may receive one or more environmental parameters including at least one of UE position information, a time of day, a number of connected UEs at the base station, or a combination thereof. The UE may then perform a communication procedure with the base station based on the information associated with the surrounding in which the UE is located.

25 Claims, 15 Drawing Sheets

(56) References Cited

U.S. PATENT DOCUMENTS

| | | | | |
|---|---|---|---|---|
| 2019/0205115 | A1* | 7/2019 | Gomes | H04W 4/50 |
| 2019/0238436 | A1* | 8/2019 | Volos | G06N 7/01 |
| 2019/0260455 | A1 | 8/2019 | Ryu et al. | |
| 2019/0261193 | A1 | 8/2019 | Torsner et al. | |
| 2020/0389759 | A1* | 12/2020 | Wang | H04W 4/023 |
| 2021/0049906 | A1* | 2/2021 | Saleh | G08G 1/0125 |
| 2021/0184748 | A1 | 6/2021 | Luo et al. | |
| 2023/0176212 | A1* | 6/2023 | Kim | G01S 17/04 455/456.1 |
| 2023/0337269 | A1* | 10/2023 | Rao | H04B 7/088 |

* cited by examiner

500

600

800

1000

1200

TECHNIQUES FOR SURROUNDING INFORMATION INDICATION

FIELD OF TECHNOLOGY

The following relates to wireless communication at a user equipment (UE), including techniques for surrounding information indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications system, a base station and a UE may use sensor information to initiate and continue communication.

SUMMARY

The described techniques relate to improved methods, systems, devices, and apparatuses that support techniques for surrounding information indication. Generally, the described techniques provide for the use of sensor information for robust communication procedures. A base station may use sensors included in the base station to identify information associated with an environment of a user equipment (UE). The base station may identify an environment that the UE is in, and may send an indication to the UE that includes information about the environment. In some examples, the base station may predict a potential blockage for the UE and transmits the indication of potential blockage to the UE. The UE may receive an indication including environmental information and may perform a communication procedure based on the environmental information indicated by the base station.

A method for wireless communication at a user equipment (UE) is described. The method may include receiving, from a base station, signaling including information associated with a surrounding in which the UE is located, where the information associated with the surrounding in which the UE is located is determined via a sensor coupled with the base station and performing a communication procedure with the base station based on the information associated with the surrounding in which the UE is located.

An apparatus for wireless communication at a UE is described. The apparatus may include a processor, memory coupled with the processor, and instructions stored in the memory. The instructions may be executable by the processor to cause the apparatus to receive, from a base station, signaling including information associated with a surrounding in which the UE is located, where the information associated with the surrounding in which the UE is located is determined via a sensor coupled with the base station and perform a communication procedure with the base station based on the information associated with the surrounding in which the UE is located.

Another apparatus for wireless communication at a UE is described. The apparatus may include means for receiving, from a base station, signaling including information associated with a surrounding in which the UE is located, where the information associated with the surrounding in which the UE is located is determined via a sensor coupled with the base station and means for performing a communication procedure with the base station based on the information associated with the surrounding in which the UE is located.

A non-transitory computer-readable medium storing code for wireless communication at a UE is described. The code may include instructions executable by a processor to receive, from a base station, signaling including information associated with a surrounding in which the UE is located, where the information associated with the surrounding in which the UE is located is determined via a sensor coupled with the base station and perform a communication procedure with the base station based on the information associated with the surrounding in which the UE is located.

In some examples of the method, apparatuses, and non-transitory computer-readable medium described herein, receiving the information may include operations, features, means, or instructions for receiving one or more environmental parameters including at least one of UE position information, a time of day, a number of connected UEs at the base station, or a combination thereof, where the communication procedure may be based on the one or more environmental parameters.

Some examples of the method, apparatuses, and non-transitory computer-readable medium described herein may further include operations, features, means, or instructions for predicting a potential blockage for the UE based on receiving the information associated with the surrounding in which the UE may be located, where the communication procedure may be based on predicting the potential blockage.

Some examples of the method, apparatuses, and non-transitory computer-readable medium described herein may further include operations, features, means, or instructions for identifying a deployment information associated with the UE based on receiving the information associated with the surrounding in which the UE may be located, where the communication procedure may be based on the deployment information. In some examples of the method, apparatuses, and non-transitory computer-readable medium described herein, the deployment information includes at least one of an urban microcell deployment, an urban macrocell deployment, an inhouse deployment, or a combination thereof.

Some examples of the method, apparatuses, and non-transitory computer-readable medium described herein may further include operations, features, means, or instructions for predicting that the UE may be on a trajectory to transition into an indoor setting based on receiving the information associated with the surrounding in which the UE may be located, where the communication procedure may be based on predicting that the UE may be on the trajectory to transition into the indoor setting.

Some examples of the method, apparatuses, and non-transitory computer-readable medium described herein may further include operations, features, means, or instructions for determining a crowd level at the surrounding based on receiving the information associated with the surrounding in which the UE may be located, where the communication procedure includes transmitting an adjusted measurement report based on the crowd level at the surrounding.

Some examples of the method, apparatuses, and non-transitory computer-readable medium described herein may further include operations, features, means, or instructions for detecting an object within the surrounding based on receiving the information associated with the surrounding in which the UE may be located, where the communication procedure may be based on the detected object. In some examples of the method, apparatuses, and non-transitory computer-readable medium described herein, receiving the information may include operations, features, means, or instructions for receiving, via a control signal, the information associated with the surrounding in which the UE may be located.

In some examples of the method, apparatuses, and non-transitory computer-readable medium described herein, the control signal includes at least one of a downlink control information, a medium access control layer control element, a radio resource control signal, or a combination thereof. In some examples of the method, apparatuses, and non-transitory computer-readable medium described herein, the information indicates whether the UE may be located indoors, outdoors, or indeterminate.

A method for wireless communication at a base station is described. The method may include receiving, via a sensor included within the base station, information associated with a surrounding in which a UE is located, transmitting, to the UE, an indication of the information associated with the surrounding in which the UE is located based on the receiving, and performing a communication procedure with the UE based on transmitting the indication of the information associated with the surrounding in which the UE is located.

An apparatus for wireless communication at a base station is described. The apparatus may include a processor, memory coupled with the processor, and instructions stored in the memory. The instructions may be executable by the processor to cause the apparatus to receive, via a sensor included within the base station, information associated with a surrounding in which a UE is located, transmit, to the UE, an indication of the information associated with the surrounding in which the UE is located based on the receiving, and perform a communication procedure with the UE based on transmitting the indication of the information associated with the surrounding in which the UE is located.

Another apparatus for wireless communication at a base station is described. The apparatus may include means for receiving, via a sensor included within the base station, information associated with a surrounding in which a UE is located, means for transmitting, to the UE, an indication of the information associated with the surrounding in which the UE is located based on the receiving, and means for performing a communication procedure with the UE based on transmitting the indication of the information associated with the surrounding in which the UE is located.

A non-transitory computer-readable medium storing code for wireless communication at a base station is described. The code may include instructions executable by a processor to receive, via a sensor included within the base station, information associated with a surrounding in which a UE is located, transmit, to the UE, an indication of the information associated with the surrounding in which the UE is located based on the receiving, and perform a communication procedure with the UE based on transmitting the indication of the information associated with the surrounding in which the UE is located.

Some examples of the method, apparatuses, and non-transitory computer-readable medium described herein may further include operations, features, means, or instructions for receiving, via a camera included within the base station, an image of the surrounding in which the UE may be located and processing the image to identify the information associated with the surrounding in which the UE may be located, where transmitting the indication may be based on processing the image.

Some examples of the method, apparatuses, and non-transitory computer-readable medium described herein may further include operations, features, means, or instructions for receiving, via the sensor included within the base station, one or more environmental parameters including at least one of UE position information, a time of day, a number of connected UEs at the base station, or a combination thereof and identifying the information associated with the surrounding in which the UE may be located based on receiving the one or more environmental parameters.

Some examples of the method, apparatuses, and non-transitory computer-readable medium described herein may further include operations, features, means, or instructions for determining historical data associated with the surrounding in which the UE may be located and identifying the information associated with the surrounding in which the UE may be located based on the historical data.

Some examples of the method, apparatuses, and non-transitory computer-readable medium described herein may further include operations, features, means, or instructions for predicting a potential blockage for the UE based on receiving the information associated with the surrounding in which the UE may be located, where transmitting the indication may be based on predicting the potential blockage.

Some examples of the method, apparatuses, and non-transitory computer-readable medium described herein may further include operations, features, means, or instructions for identifying a deployment information associated with the UE based on receiving the information associated with the surrounding in which the UE may be located, where transmitting the indication may be based on the deployment information. In some examples of the method, apparatuses, and non-transitory computer-readable medium described herein, the deployment information includes at least one of an urban microcell deployment, an urban macrocell deployment, an inhouse deployment, or a combination thereof.

Some examples of the method, apparatuses, and non-transitory computer-readable medium described herein may further include operations, features, means, or instructions for predicting that the UE may be on a trajectory to transition into an indoor setting based on receiving the information associated with the surrounding in which the UE may be located, where transmitting the indication may be based on predicting that the UE may be on the trajectory to transition into the indoor setting. Some examples of the method, apparatuses, and non-transitory computer-readable medium described herein may further include operations, features, means, or instructions for determining a crowd level at the surrounding based on receiving the information associated with the surrounding in which the UE may be located, where transmitting the indication includes transmitting an indication of the crowd level at the surrounding.

Some examples of the method, apparatuses, and non-transitory computer-readable medium described herein may further include operations, features, means, or instructions for detecting an object within the surrounding based on receiving the information associated with the surrounding in which the UE may be located, where transmitting the indication includes transmitting an indication of the detected object.

In some examples of the method, apparatuses, and non-transitory computer-readable medium described herein, transmitting the indication may include operations, features, means, or instructions for transmitting, via a control signal, the indication of the information associated with the surrounding in which the UE may be located.

In some examples of the method, apparatuses, and non-transitory computer-readable medium described herein, the control signal includes at least one of a downlink control information, a medium access control layer control element, a radio resource control signal, or a combination thereof. In some examples of the method, apparatuses, and non-transitory computer-readable medium described herein, the indication indicates whether the UE may be located indoors, outdoors, or indeterminate.

DETAILED DESCRIPTION

Figure 1:
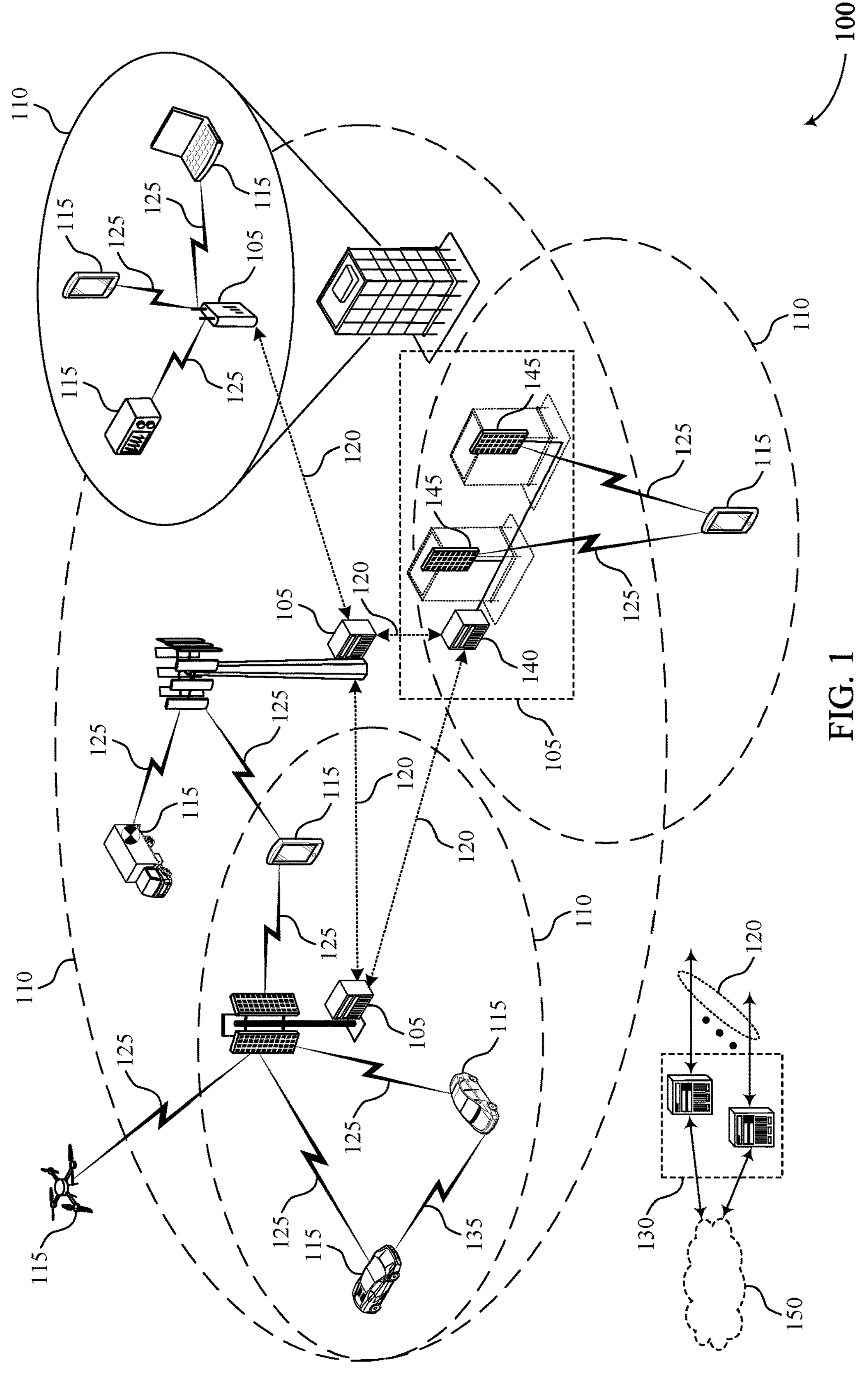
FIG. 1 illustrates an example of a wireless communications system that supports techniques for surrounding information indication in accordance with aspects of the present disclosure.

A wireless communications system may support communications between one or more communication devices. Some wireless communications systems may support the use of sensor information for communications between user equipments (UEs) and base stations. Using sensor information collected from a sensor (such as a camera) included in a device, can assist wireless communications in a number of ways including beam tracking between a transmitter (e.g., base station) and a receiver (e.g., UE), measurement reporting based on such information for ranking and/or selecting candidates, power control for transmitting signals, interference management among transmitters and/or receivers, initial access, and power saving techniques. In some aspects, a UE may indicate whether the UE is located in an indoor setting or an outdoor setting.

One or more aspects of the present disclosure provide for a base station to send information about an environment of the UE. Wireless communications systems may use the techniques depicted herein to perform communication procedures (such as, initial access, beam tracking, power control, and beam reporting, etc.) using sensor information. In some examples, a base station may receive, via a sensor included within the base station, information associated with a UE. In some examples, the base station may include a camera, a radio detection and ranging sensor, and a light detection and ranging sensor, and the base station may receive information about an environment of a UE using the sensors. For instance, the base station may determine the location of the UE and whether the UE is located in an indoor environment or an outdoor environment. The base station may identify surrounding information of the UE, and may send an indication of the surrounding information to the UE. The surrounding information may include one or more environmental parameters. In some aspects, the UE may perform a communication procedure based on receiving the indication of the one or more environmental parameters. The UE and the base station may then communicate based on the communication procedure.

Communications devices having the capability to use sensor information for wireless communications may utilize the techniques described herein to experience power saving, such as reduced power consumption and extended battery life while ensuring reliable and efficient communications between UEs and base stations. Particular aspects of the subject matter described in this disclosure may be implemented to realize one or more enhancements. The techniques employed by the described UEs may provide benefits and enhancements to the operation of the UEs. For example, operations performed by the UEs may provide improvements to wireless operations. Additionally or alternatively, the techniques employed by the described UEs may provide time and power savings. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further described in the context of process flow. Aspects of the disclosure are further illustrated by and described with reference to apparatus diagrams, system diagrams, and flowcharts that relate to techniques for surrounding information indication.

FIG. 1 illustrates an example of a wireless communications system 100 that supports techniques for surrounding information indication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to aspects depicted herein, the UE 115 may receive, from a base station 105, signaling including information associated with a surrounding in which the UE 115 is located. The base station 105 may determine the information associated with the surrounding of the UE 115 via a sensor coupled with the base station 105. In some examples, the UE 115 may receive one or more environmental parameters from the base station 105. The one or more environmental parameters may include at least one of UE position information, a time of day, a number of connected UEs at the base station, or a combination thereof. The UE 115 may perform a communication procedure with the base station based on the information associated with the surrounding in which the UE 115 is located. In some examples, the communication procedure may be based on the one or more environmental parameters indicated by the base station 105.

Figure 2:
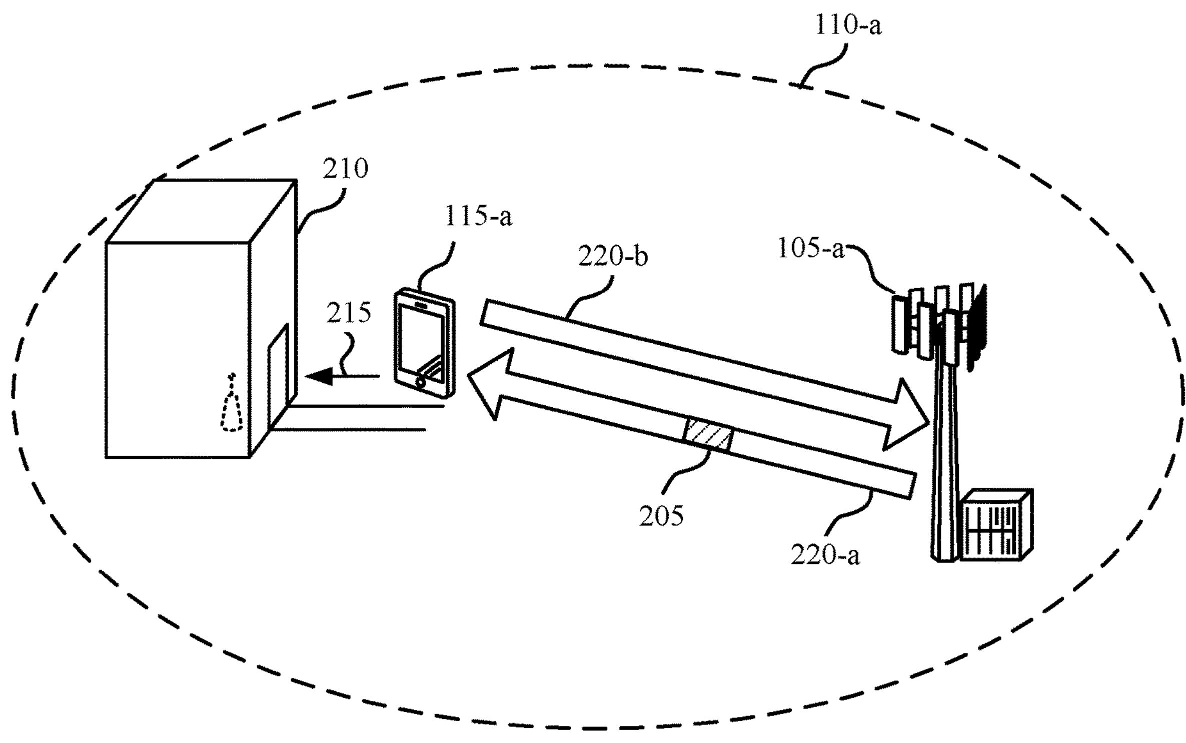
FIG. 2 illustrates an example of a wireless communications system that supports techniques for surrounding information indication in accordance with aspects of the present disclosure.
Figure 2:
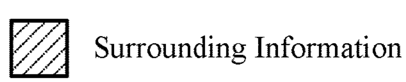
Figure 2:

FIG. 2 illustrates an example of a wireless communications system 200 that supports techniques for surrounding information indication in accordance with aspects of the present disclosure. The wireless communications system 200 may implement or be implemented by aspects of wireless communications system 100. For example, the wireless communications system 200 may include a UE 115-*a* and a base station 105-*a*, which may be examples of corresponding devices described with reference to FIG. 1. The UE 115-*a* and the base station 105-*a* may communicate over a communication link 220-*a* (e.g., a downlink) and a communication link 220-*b* (e.g., an uplink), which may be examples of a communication link 125 described with reference to FIG. 1. The UE 115-*a* and the base station 105-*a* may communicate within a geographic coverage area 110-*a* of the base station 105-*a*, which may be an example of a geographic coverage area 110 described with reference to FIG. 1.

The wireless communications system 200 may support handling power control and efficiency related to a surrounding information indication to enhance communications efficiency in a wireless communications system. The described techniques resolve some challenges related to some techniques for signaling for communication procedures. The wireless communications system 200 may enable the use of sensor information for efficient communication between a transmitter and a receiver (e.g., base station 105 and UE 115-*a*).

In some examples, a UE 115-*a* and a base station 105-*a* may perform a beam management procedure to find at least one beam pair for communication. The base station 105-*a* may be configured with multiple antennas, which may be used for directional or beamformed transmissions (not shown). Similarly, the UE 115-*a* may be configured with multiple antennas, which may be used for directional or beamformed transmissions (not shown). The UE 115-*a* and the base station 105-*a* may use sensor information (e.g., image from a camera) to enhance the beam management procedure. Similarly, sensor information from one wireless device (e.g., a UE) may be shared with another wireless device (e.g., a base station) to enhance communication efficiency.

According to some aspects, wireless communications systems may support the use of sensor information from a sensor included in a wireless device. Using sensor information collected at a wireless device (e.g., a base station or UE), may assist wireless communications in a number of ways including beam tracking between transmitter and receiver, measurement reporting based on such information for ranking and/or selecting candidates, power control for transmitting signals, interference management among transmitters and/or receivers, initial access, and power saving techniques. In some examples, a UE may indicate whether the UE is located in an indoor or outdoor setting. In addition to a UE determining it's surrounding information, it may be beneficial for the base station to provide information about a UE's surrounding (or environment). In particular, having knowledge of an environment determined by the base station may aid in more robust communication procedures at the UE.

According to one or more aspects of the present disclosure, the base station 105-*a* may transmit an indication of surrounding information to the UE 115-*a*. For instance, the base station 105-*a* may transmit an indication of information about the environment (i.e., the UE's surroundings) to the UE 115-*a*. As depicted in the example of FIG. 2, the UE 115-*a* may receive, from a base station 105-*a*, signaling including information 205 associated with a surrounding in which the UE 115-*a* is located. The signaling may be a control signal. In some examples, the control signal may include at least one of a downlink control information, a medium access control layer control element, a radio resource control signal, or a combination thereof. In some examples, the information 205 associated with the surrounding in which the UE is located is determined via a sensor coupled with the base station 105-*a*. For instance, the base station 105-*a* may identify an environment that the UE 115-*a* is in, and may send an indication to the UE 115-*a*. The indication may carry some information 205 about the environment of the UE 115-*a*. In some examples, the information 205 may indicate a traffic load at the base station 105-*a*. Additionally or alternatively, the information 205 may include information about a scheduler used by the base station 105-*a*.

The base station 105-*a* may infer this information 205 based on at least one of sensor information (e.g., camera included in or otherwise coupled with the UE), UE position information, time of day, number of connected UEs at the base station 105-*a*, or a combination thereof. Accordingly, the UE 115-*a* may receive one or more environmental parameters including at least one of UE position information, a time of day, a number of connected UEs at the base station, or a combination thereof. The UE 115-*a* may receive the information 205 and may perform a communication procedure with the base station 105-*a* based on the information associated with the surrounding in which the UE 115-*a* is located. In some examples, the communication procedure may be based on the one or more environmental parameters.

In some examples, the base station 105-*a* may predict a potential blockage for the UE 115-*a*. The UE 115-*a* may also identify the potential blockage based on receiving the information associated with the surrounding in which the UE 115-*a* is located. As depicted herein, the base station 105-*a* may predict that the UE 115-*a* is about to enter structure 210 (e.g., a building). In some examples, the base station 105-*a* may receive an image of the UE 115-*a* and environment information associated with the UE 115-*a*. The base station 105-*a* may analyze the environment information (such as, one more objects surrounding the UE 115-*a*) to predict the potential blockage. Based on the prediction, the base station 105-*a* may transmit the indication of surrounding information 205 to the UE 115-*a*. Thus, the base station 105-*a* may be able to gather information about the surrounding of the UE 115-*a*, and the base station 105-*a* may have additional information that may not be present at the UE 115-*a*. In some instances, to acquire this information, the base station 105-*a* may leverage historical data. For instance, the base station 105-*a* may identify a location pattern for the UE 115-*a*, and may predict a potential blockage based on the location pattern. In some examples, the base station 105-*a* may infer that for a given set of positions on given days and given time intervals in each day, a given environment is predicted to be crowded (e.g., shopping malls on weekends, etc.). In some examples, the UE 115-*a* may use the information 205 for identifying the environment and relaying operations.

Additionally or alternatively, the base station 105-*a* may identify a deployment information associated with the UE 115-*a*. The UE 115-*a* may identify the deployment information based on receiving the information 205 associated with the surrounding in which the UE is located. This information could be about whether the UE 115-*a* is located in an indoor environment or an outdoor environment. In some examples, the base station 105-*a* may indicate the deployment information including at least one of an urban microcell deployment, an urban macrocell deployment, an inhouse deployment, or a combination thereof.

According to some aspects, the base station 105-*a* may identify or determine locations of one or more UEs 115. The base station 105-*a* may predict that the UE 115-*a* is on a trajectory 215 to transition into an indoor setting (e.g., inside the structure 210). In some instances, the base station 105-*a* can infer through a camera (e.g., sensor) that an uplink UE beam for the UE 115-*a* is predicted to be blocked (because the UE is about to pass across a wall or enter a building). The base station 105-*a* may transmit the information 205 about the trajectory 215 to the UE 115-*a*. The UE 115-*a* may predict that the UE 115-*a* is on a trajectory 215 to transition into an indoor setting based at on receiving the information 205. In some examples, the base station 105-*a* may use sensor information to determine that a line of sight of the UE 115-*a* is about to be blocked by an object (e.g., a truck). The base station 105-*a* may indicate the upcoming change in line of sight to the UE 115-*a*.

The base station 105-*a* may determine a crowd level at the surrounding of the UE 115-*a*. The UE 115-*a* may determine the crowd level based on receiving the information associated with the surrounding of the UE 115-*a*. The information may indicate whether the UE 115-*a* is in a crowded environment. The indication may be a binary indication or may not be a binary indication and may include different levels for crowdedness. The UE 115-*a* may receive the indication and may adjust a measurement report based on the crowd level at the surrounding of the UE 115-*a*. In some examples, the UE 115-*a* may transmit an adjusted measurement report based on the crowd level at the surrounding. In some examples, the UE 115-*a* may detect an object within the surrounding based on receiving the information 205. The UE 115-*a* may perform a communication procedure based on the detected object. The UE 115-*a* may utilize the information 205 from the base station 105-*a* to make more informed handover decisions. Thus, the aspects of the present disclosure provide for transmission of additional information that aids the UE 115-*a* in performing a communication procedure. With this extra information, UE 115-*a* may be able to anticipate a bidirectional forwarding detection event (and/or signal-to-noise ration/reference signal received power reduction). For example, the UE 115-*a* may be able to anticipate a bidirectional forwarding detection event as it moves inside a building (e.g., structure 210) and proactively gets ready for the transition.

The UE 115-*a* may also use the information to train a machine learning model. In some instances, the UE 115-*a* may analyze the indication (such as, using machine-learning techniques) to determine communication procedures. Thus, the indication may help the UE improve decisions of which algorithm or machine learning model or neural network to use (for inference) in performing a communication procedure. In some examples, the UE 115-*a* may decide to train a neural network for particular scenarios as the environment changes (determined according to the information transmitted by the base station 105-*a*). For instance, if a neural network has been trained in an outdoor setting, it may not be well-suited to be used when the UE 115-*a* is indoors. When the base station 105-*a* indicates that the UE 115-*a* is transitioning to an indoor setting. Upon receiving the indication, the UE 115-*a* may start training a neural network for the indoor setting (e.g., through requesting known payload from the base station 105-*a*).

The UE 115-*a* may utilize the techniques depicted herein to manage power consumption. For instance, in an environment where the load of traffic is high, for some packets that are not delay-sensitive, the UE 115-*a* can choose to reduce the frequency of scheduling request transmissions (as the UE 115-*a* is aware that the base station 105-*a* is heavily loaded). Additionally or alternatively, UEs may use the surrounding information (indication of indoor environment or outdoor environment or crowded environment) for sidelink communications. In sidelink communications, two UEs may share a common zone identifier. In spite of being in the same zone, one of the UEs may be in an indoor setting, and the other may be in an outdoor setting, In some examples, the UEs may utilize surrounding information (e.g., information about the environment) to determine resources to use for sidelink communication.

Figure 3:
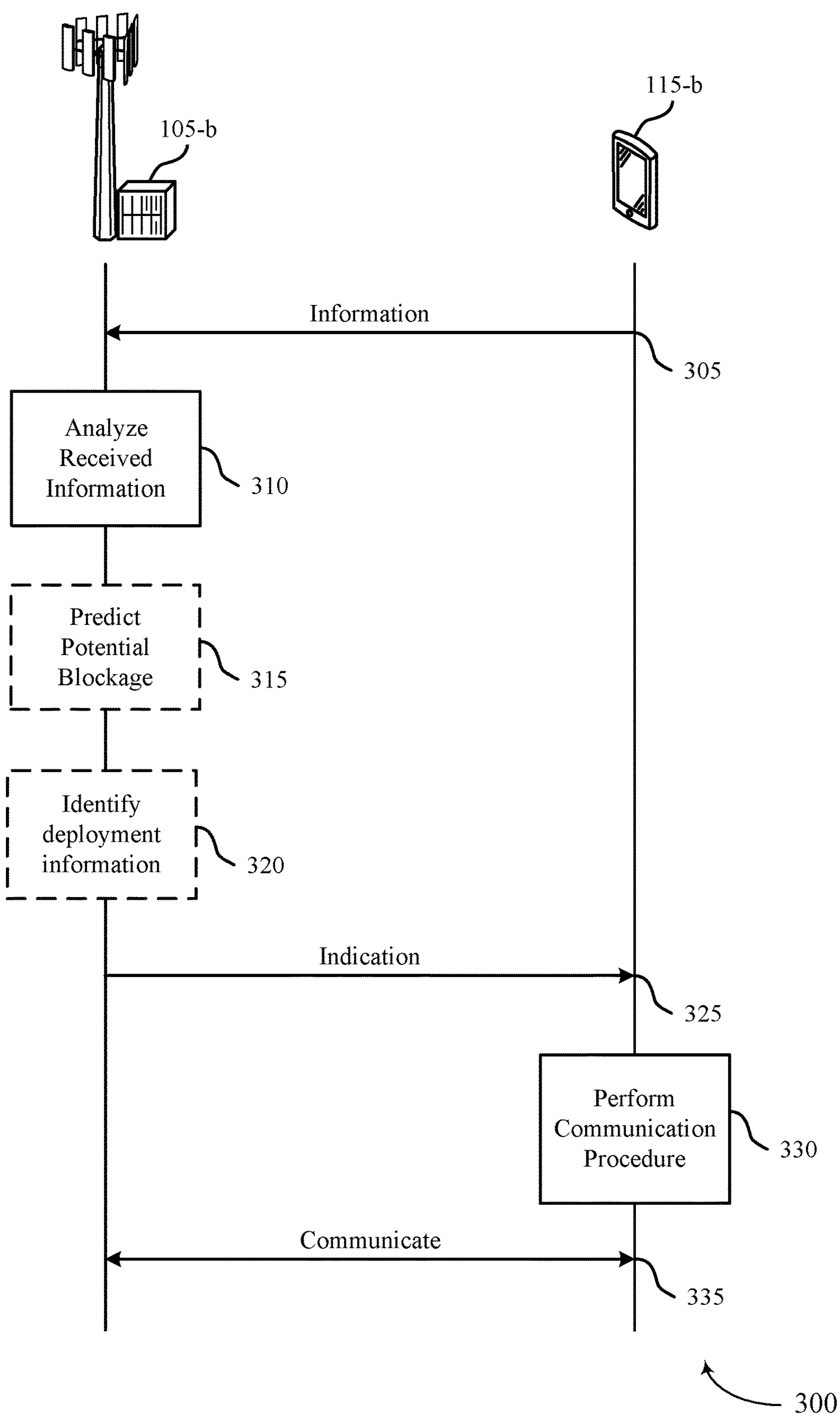
FIG. 3 illustrates an example of a process flow that supports techniques for surrounding information indication in accordance with aspects of the present disclosure.

FIG. 3 illustrates an example of a process flow 300 that supports techniques for surrounding information indication in accordance with aspects of the present disclosure. In some examples, process flow 300 may implement aspects of wireless communications system 100 and wireless communications system 200. The base station 105-*b* may be an example of a base station 105 described with reference to FIGS. 1 and 2. The UE 115-*b* may be an example of a UE 115 described with reference to FIGS. 1 and 2.

In the following description of the process flow 300, the operations between the base station 105-*b* and the UE 115-*b* may be transmitted in a different order than the exemplary order shown. The operations performed by the base station 105-*b* or the UE 115-*b* may be performed in different orders or at different times than the exemplary order shown. Some operations may also be omitted from the process flow 300, or other operations may be added to the process flow 300. Further, the base station 105-*b* and the UE 115-*b* are not limiting, as the described features may be associated with any number of different devices.

At 305, the base station 105-*b* may receive via a sensor included within the base station 105-*b*, information associated with a surrounding in which the UE 115-*b* is located. In particular, the base station 105-*b* may use a sensor included within the base station 105-*b* to receive information associated with the UE 115-*b*. In some examples, the base station 105-*b* may receive, via a camera included within the base station 105-*b*, an image of the UE 115-*b* and the environment of the UE 115-*b*. Additionally or alternatively, the base station 105-*b* may receive, via a radio detection and ranging sensor included within the base station 105-*b*, a signal associated with the UE 115-*b*. In some examples, the base station 105-*b* may receive, via a radio detection and ranging sensor included within the base station 105-*b*, a signal associated with the UE 115-*b*. In some examples, the base station 105-*b* may receive, via the sensor included within the base station 105-*b*, one or more environmental parameters including at least one of UE position information, a time of day, a number of connected UEs at the base station, or a combination thereof.

At 310, the base station 105-*b* may analyze the received information. For example, the base station 105-*b* may receive an image of the surrounding of the UE 115-*b*. The base station 105-*b* may then process the image of surrounding of the UE 115-*b* to identify one or more environmental parameters. In some examples, the base station 105-*b* may receive, via a camera included within the base station 105-*b*, an image of the surrounding in which the UE 115-*b* is located. The base station 105-*b* may then process the image to identify the information associated with the surrounding in which the UE 115-*b* is located.

At 315, the base station 105-*b* may optionally predict a potential blockage for the UE 115-*b* based on receiving the information associated with the surrounding in which the UE 115-*b* is located. At 320, the base station 105-*b* may optionally identify a deployment information associated with the UE 115-*b* based on receiving the information associated with the surrounding in which the UE 115-*b* is located.

At 325, the base station 105-*b* may transmit, to the UE 115-*b*, an indication of the information associated with the surrounding in which the UE 115-*b* is located based on receiving the information associated with the surrounding of the UE 115-*b*. At 330, the UE 115-*b* may perform a communication procedure with the base station 105-*b* based on the information associated with the surrounding in which the UE 115-*b* is located. At 335, the UE 115-*b* and the base station 105-*b* may communicate with each other according to the communication procedure.

The operations performed by the UE 115-*b* and the base station 105-*b* as part of, but not limited to, process flow 300 may provide improvements to communication links in wireless communications systems. Further, the operations performed by the UE 115-*b* and the base station 105-*b* as part of, but not limited to, process flow 300 may provide benefits and enhancements to the operation of the UE 115-*b* while performing communications having a high reliability and low latency. For example, the described methods in the process flow 300 may support using sensor information for channel monitoring and wireless communications, among other enhancements.

Figure 4:
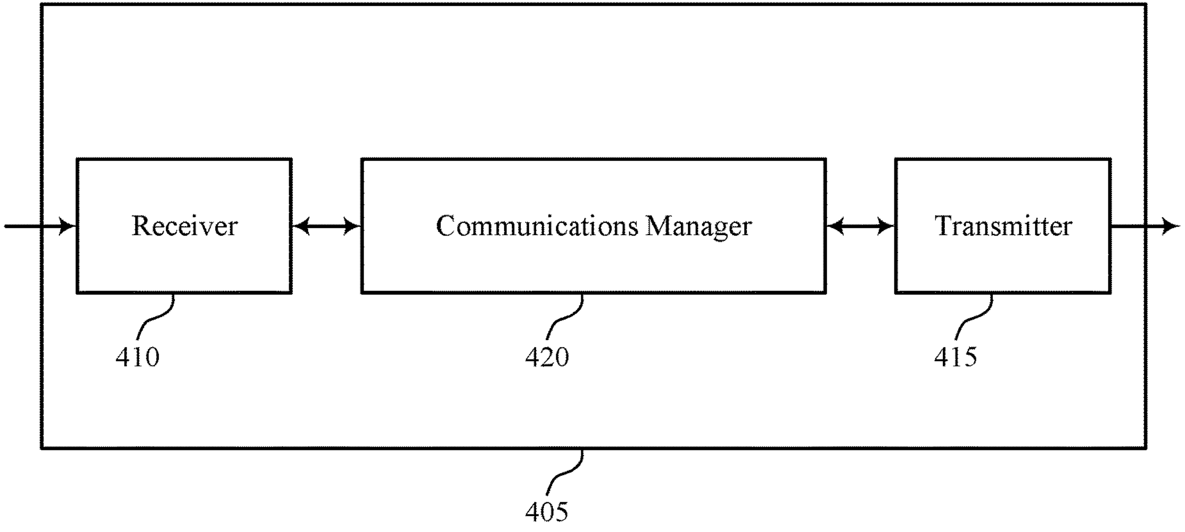
FIGS. 4 and 5 show block diagrams of devices that support techniques for surrounding information indication in accordance with aspects of the present disclosure.

FIG. 4 shows a block diagram 400 of a device 405 that supports techniques for surrounding information indication in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for surrounding information indication). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for surrounding information indication). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for surrounding information indication as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving, from a base station, signaling including information associated with a surrounding in which the UE is located, where the information associated with the surrounding in which the UE is located is determined via a sensor coupled with the base station. The communications manager 420 may be configured as or otherwise support a means for performing a communication procedure with the base station based on the information associated with the surrounding in which the UE is located.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing, reduced power consumption, and more efficient utilization of communication resources.

Figure 5:
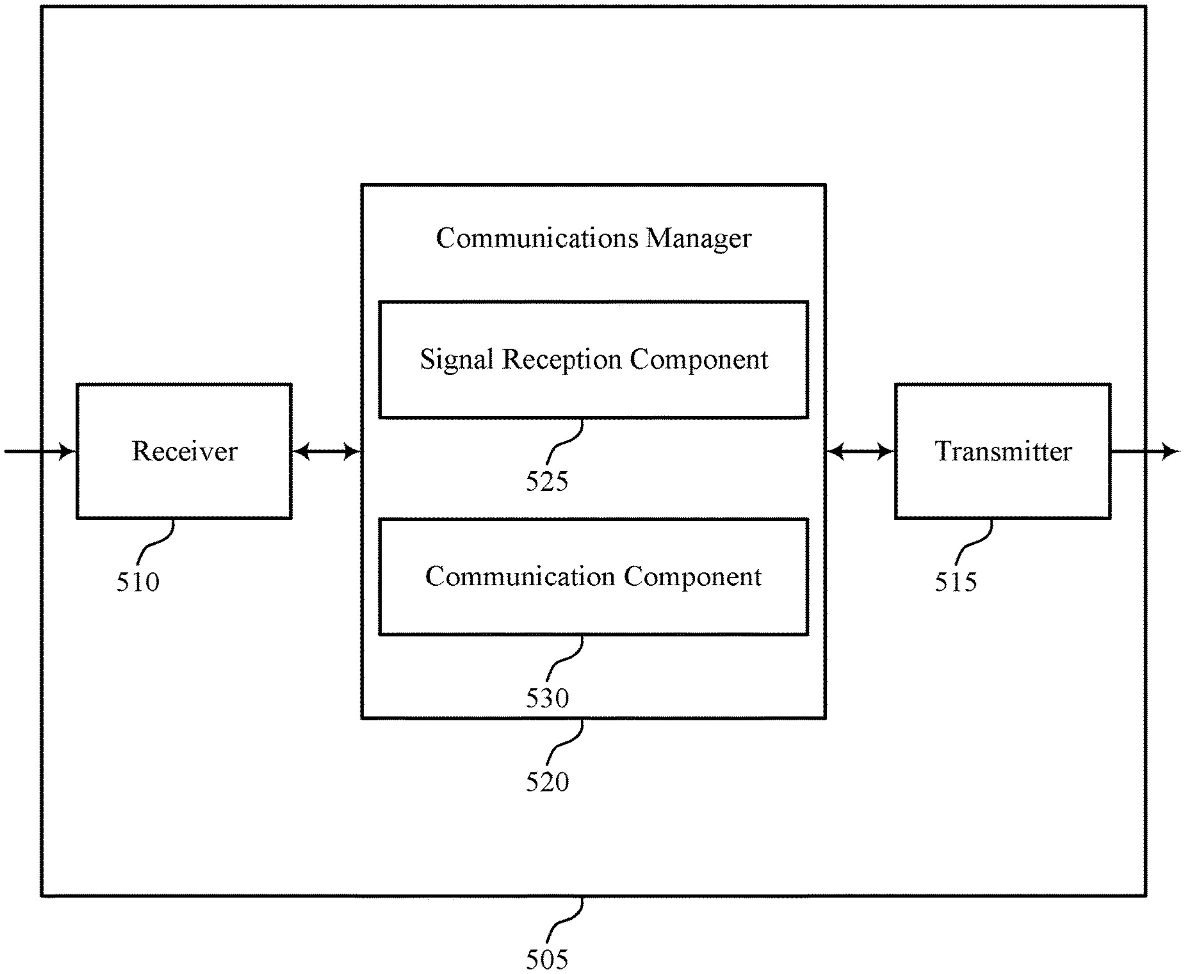

FIG. 5 shows a block diagram 500 of a device 505 that supports techniques for surrounding information indication in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for surrounding information indication). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for surrounding information indication). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for surrounding information indication as described herein. For example, the communications manager 520 may include a signal reception component 525 a communication component 530, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The signal reception component 525 may be configured as or otherwise support a means for receiving, from a base station, signaling including information associated with a surrounding in which the UE is located, where the information associated with the surrounding in which the UE is located is determined via a sensor coupled with the base station. The communication component 530 may be configured as or otherwise support a means for performing a communication procedure with the base station based on the information associated with the surrounding in which the UE is located.

Figure 6:
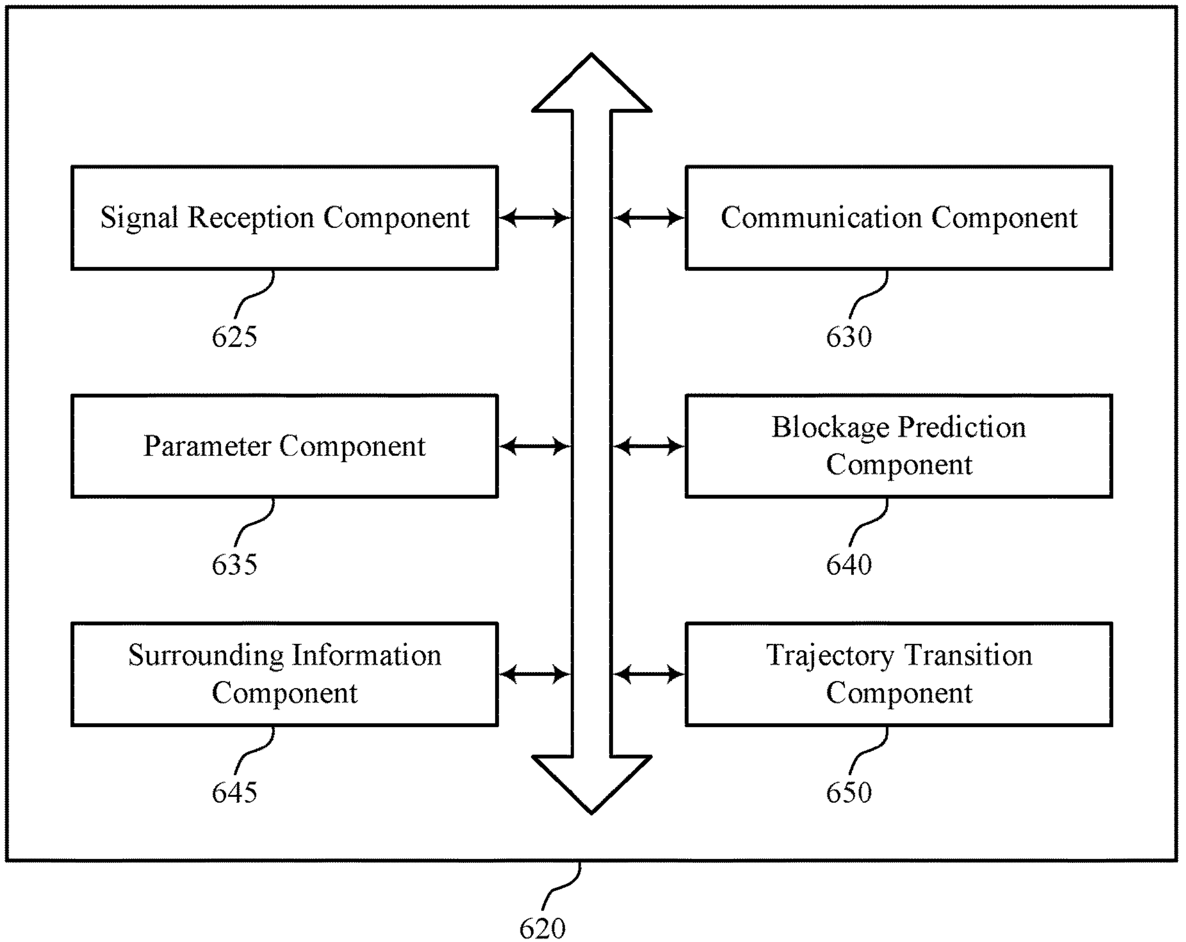
FIG. 6 shows a block diagram of a communications manager that supports techniques for surrounding information indication in accordance with aspects of the present disclosure.

FIG. 6 shows a block diagram 600 of a communications manager 620 that supports techniques for surrounding information indication in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for surrounding information indication as described herein. For example, the communications manager 620 may include a signal reception component 625, a communication component 630, a parameter component 635, a blockage prediction component 640, a surrounding information component 645, a trajectory transition component 650, or any combination thereof. Each of these components may communicate, directly or indirectly, with one another (e.g., via one or more buses).

The communications manager 620 may support wireless communication at a UE in accordance with examples as disclosed herein. The signal reception component 625 may be configured as or otherwise support a means for receiving, from a base station, signaling including information associated with a surrounding in which the UE is located, where the information associated with the surrounding in which the UE is located is determined via a sensor coupled with the base station. The communication component 630 may be configured as or otherwise support a means for performing a communication procedure with the base station based on the information associated with the surrounding in which the UE is located.

In some examples, to support receiving the information, the parameter component 635 may be configured as or otherwise support a means for receiving one or more environmental parameters including at least one of UE position information, a time of day, a number of connected UEs at the base station, or a combination thereof, where the communication procedure is based on the one or more environmental parameters.

In some examples, the blockage prediction component 640 may be configured as or otherwise support a means for predicting a potential blockage for the UE based on receiving the information associated with the surrounding in which the UE is located, where the communication procedure is based on predicting the potential blockage.

In some examples, the surrounding information component 645 may be configured as or otherwise support a means for identifying a deployment information associated with the UE based on receiving the information associated with the surrounding in which the UE is located, where the communication procedure is based on the deployment information. In some examples, the deployment information includes at least one of an urban microcell deployment, an urban macrocell deployment, an inhouse deployment, or a combination thereof.

In some examples, the trajectory transition component 650 may be configured as or otherwise support a means for predicting that the UE is on a trajectory to transition into an indoor setting based on receiving the information associated with the surrounding in which the UE is located, where the communication procedure is based on predicting that the UE is on the trajectory to transition into the indoor setting.

In some examples, the surrounding information component 645 may be configured as or otherwise support a means for determining a crowd level at the surrounding based on receiving the information associated with the surrounding in which the UE is located, where the communication procedure includes transmitting an adjusted measurement report based on the crowd level at the surrounding.

In some examples, the surrounding information component 645 may be configured as or otherwise support a means for detecting an object within the surrounding based on receiving the information associated with the surrounding in which the UE is located, where the communication procedure is based on the detected object. In some examples, to support receiving the information, the signal reception component 625 may be configured as or otherwise support a means for receiving, via a control signal, the information associated with the surrounding in which the UE is located.

In some examples, the control signal includes at least one of a downlink control information, a medium access control layer control element, a radio resource control signal, or a combination thereof. In some examples, the information indicates whether the UE is located indoors, outdoors, or indeterminate.

Figure 7:
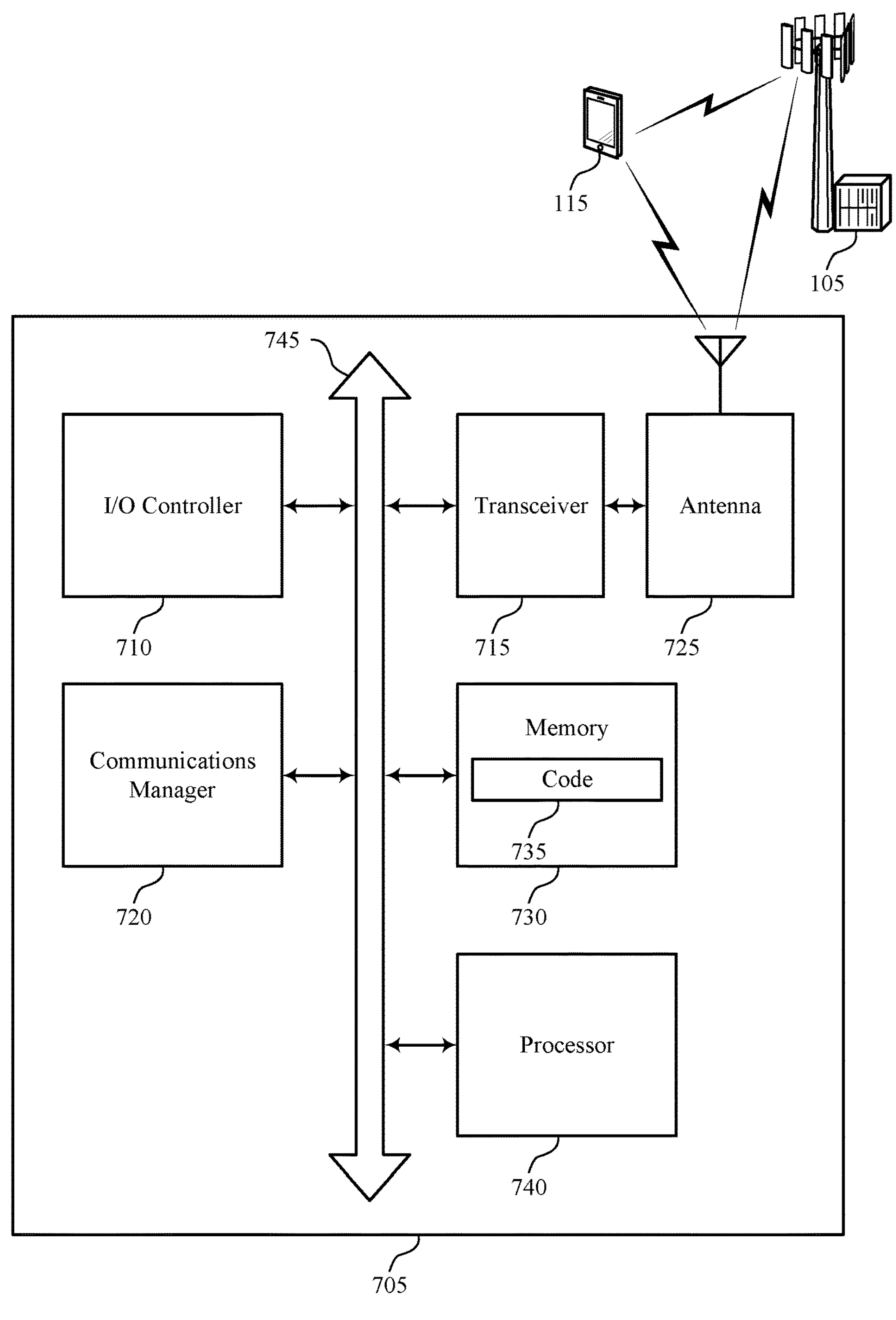
FIG. 7 shows a diagram of a system including a device that supports techniques for surrounding information indication in accordance with aspects of the present disclosure.

FIG. 7 shows a diagram of a system 700 including a device 705 that supports techniques for surrounding information indication in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for surrounding information indication). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, from a base station, signaling including information associated with a surrounding in which the UE is located, where the information associated with the surrounding in which the UE is located is determined via a sensor coupled with the base station. The communications manager 720 may be configured as or otherwise support a means for performing a communication procedure with the base station based on the information associated with the surrounding in which the UE is located.

By including or configuring the communications manager 720 in accordance with examples as described herein, the device 705 may support techniques for improved communication reliability, reduced latency, improved user experience related to reduced processing, more efficient utilization of communication resources, improved coordination between devices, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for surrounding information indication as described herein, or the processor 740 and the memory 730 may be otherwise configured to perform or support such operations.

Figure 8:
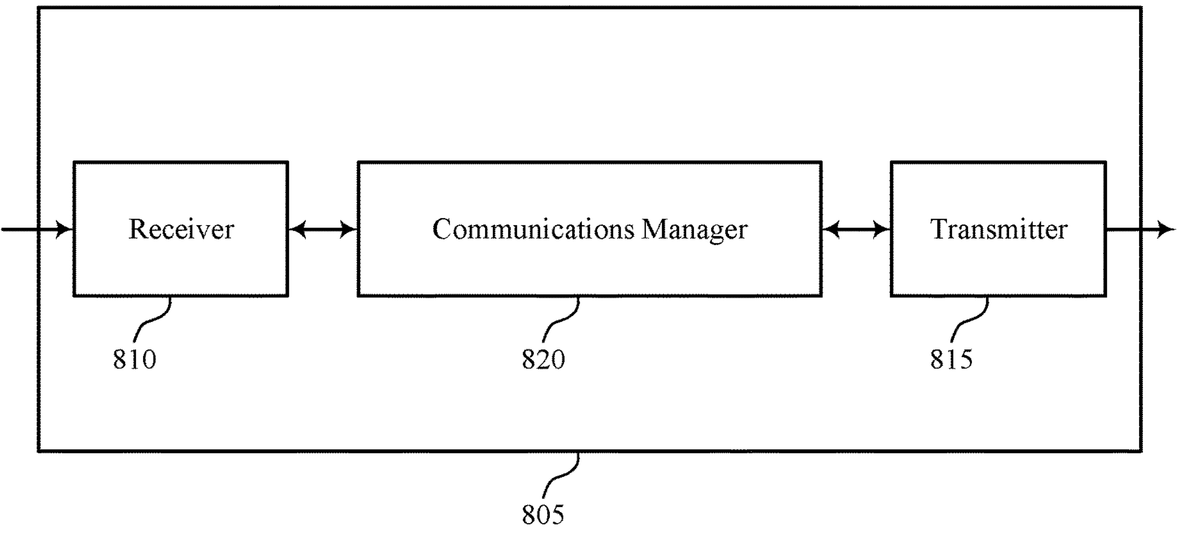
FIGS. 8 and 9 show block diagrams of devices that support techniques for surrounding information indication in accordance with aspects of the present disclosure.

FIG. 8 shows a block diagram 800 of a device 805 that supports techniques for surrounding information indication in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for surrounding information indication). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for surrounding information indication). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for surrounding information indication as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for receiving, via a sensor included within the base station, information associated with a surrounding in which a UE is located. The communications manager 820 may be configured as or otherwise support a means for transmitting, to the UE, an indication of the information associated with the surrounding in which the UE is located based on the receiving. The communications manager 820 may be configured as or otherwise support a means for performing a communication procedure with the UE based on transmitting the indication of the information associated with the surrounding in which the UE is located.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, reduced power consumption, and more efficient utilization of communication resources.

Figure 9:
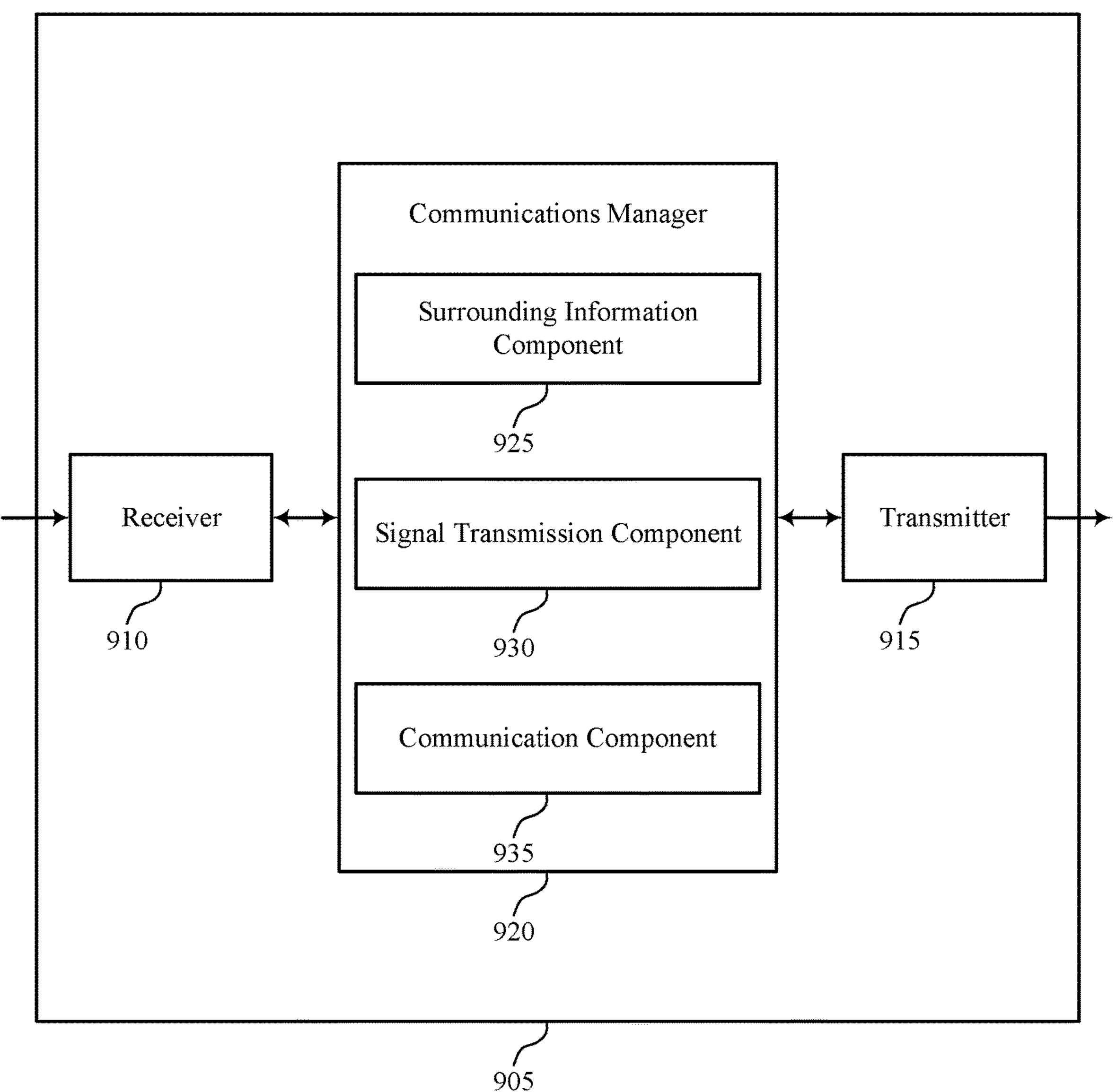

FIG. 9 shows a block diagram 900 of a device 905 that supports techniques for surrounding information indication in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for surrounding information indication). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for surrounding information indication). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for surrounding information indication as described herein. For example, the communications manager 920 may include a surrounding information component 925, a signal transmission component 930, a communication component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The surrounding information component 925 may be configured as or otherwise support a means for receiving, via a sensor included within the base station, information associated with a surrounding in which a UE is located. The signal transmission component 930 may be configured as or otherwise support a means for transmitting, to the UE, an indication of the information associated with the surrounding in which the UE is located based on the receiving. The communication component 935 may be configured as or otherwise support a means for performing a communication procedure with the UE based on transmitting the indication of the information associated with the surrounding in which the UE is located.

Figure 10:
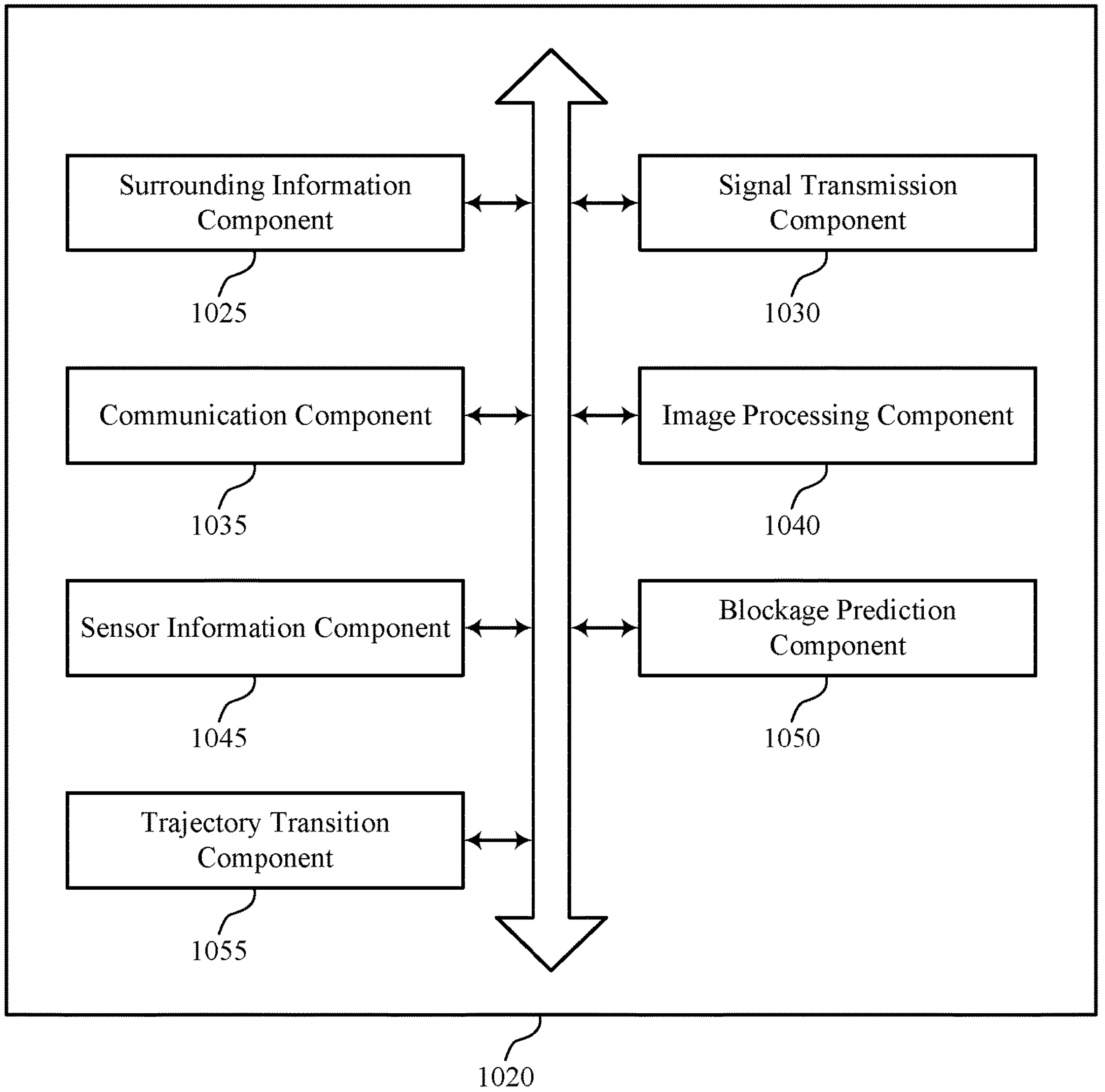
FIG. 10 shows a block diagram of a communications manager that supports techniques for surrounding information indication in accordance with aspects of the present disclosure.

FIG. 10 shows a block diagram 1000 of a communications manager 1020 that supports techniques for surrounding information indication in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for surrounding information indication as described herein. For example, the communications manager 1020 may include a surrounding information component 1025, a signal transmission component 1030, a communication component 1035, an image processing component 1040, a sensor information component 1045, a blockage prediction component 1050, a trajectory transition component 1055, or any combination thereof. Each of these components may communicate, directly or indirectly, with one another (e.g., via one or more buses).

The communications manager 1020 may support wireless communication at a base station in accordance with examples as disclosed herein. The surrounding information component 1025 may be configured as or otherwise support a means for receiving, via a sensor included within the base station, information associated with a surrounding in which a UE is located. The signal transmission component 1030 may be configured as or otherwise support a means for transmitting, to the UE, an indication of the information associated with the surrounding in which the UE is located based on the receiving. The communication component 1035 may be configured as or otherwise support a means for performing a communication procedure with the UE based on transmitting the indication of the information associated with the surrounding in which the UE is located.

In some examples, the image processing component 1040 may be configured as or otherwise support a means for receiving, via a camera included within the base station, an image of the surrounding in which the UE is located. In some examples, the image processing component 1040 may be configured as or otherwise support a means for processing the image to identify the information associated with the surrounding in which the UE is located, where transmitting the indication is based on processing the image.

In some examples, the sensor information component 1045 may be configured as or otherwise support a means for receiving, via the sensor included within the base station, one or more environmental parameters including at least one of UE position information, a time of day, a number of connected UEs at the base station, or a combination thereof. In some examples, the sensor information component 1045 may be configured as or otherwise support a means for identifying the information associated with the surrounding in which the UE is located based on receiving the one or more environmental parameters.

In some examples, the sensor information component 1045 may be configured as or otherwise support a means for determining historical data associated with the surrounding in which the UE is located. In some examples, the sensor information component 1045 may be configured as or otherwise support a means for identifying the information associated with the surrounding in which the UE is located based on the historical data.

In some examples, the blockage prediction component 1050 may be configured as or otherwise support a means for predicting a potential blockage for the UE based on receiving the information associated with the surrounding in which the UE is located, where transmitting the indication is based on predicting the potential blockage.

In some examples, the surrounding information component 1025 may be configured as or otherwise support a means for identifying a deployment information associated with the UE based on receiving the information associated with the surrounding in which the UE is located, where transmitting the indication is based on the deployment information. In some examples, the deployment information includes at least one of an urban microcell deployment, an urban macrocell deployment, an inhouse deployment, or a combination thereof.

In some examples, the trajectory transition component 1055 may be configured as or otherwise support a means for predicting that the UE is on a trajectory to transition into an indoor setting based on receiving the information associated with the surrounding in which the UE is located, where transmitting the indication is based on predicting that the UE is on the trajectory to transition into the indoor setting.

In some examples, the surrounding information component 1025 may be configured as or otherwise support a means for determining a crowd level at the surrounding based on receiving the information associated with the surrounding in which the UE is located, where transmitting the indication includes transmitting an indication of the crowd level at the surrounding.

In some examples, the surrounding information component 1025 may be configured as or otherwise support a means for detecting an object within the surrounding based on receiving the information associated with the surrounding in which the UE is located, where transmitting the indication includes transmitting an indication of the detected object.

In some examples, to support transmitting the indication, the signal transmission component 1030 may be configured as or otherwise support a means for transmitting, via a control signal, the indication of the information associated with the surrounding in which the UE is located. In some examples, the control signal includes at least one of a downlink control information, a medium access control layer control element, a radio resource control signal, or a combination thereof. In some examples, the indication indicates whether the UE is located indoors, outdoors, or indeterminate.

Figure 11:
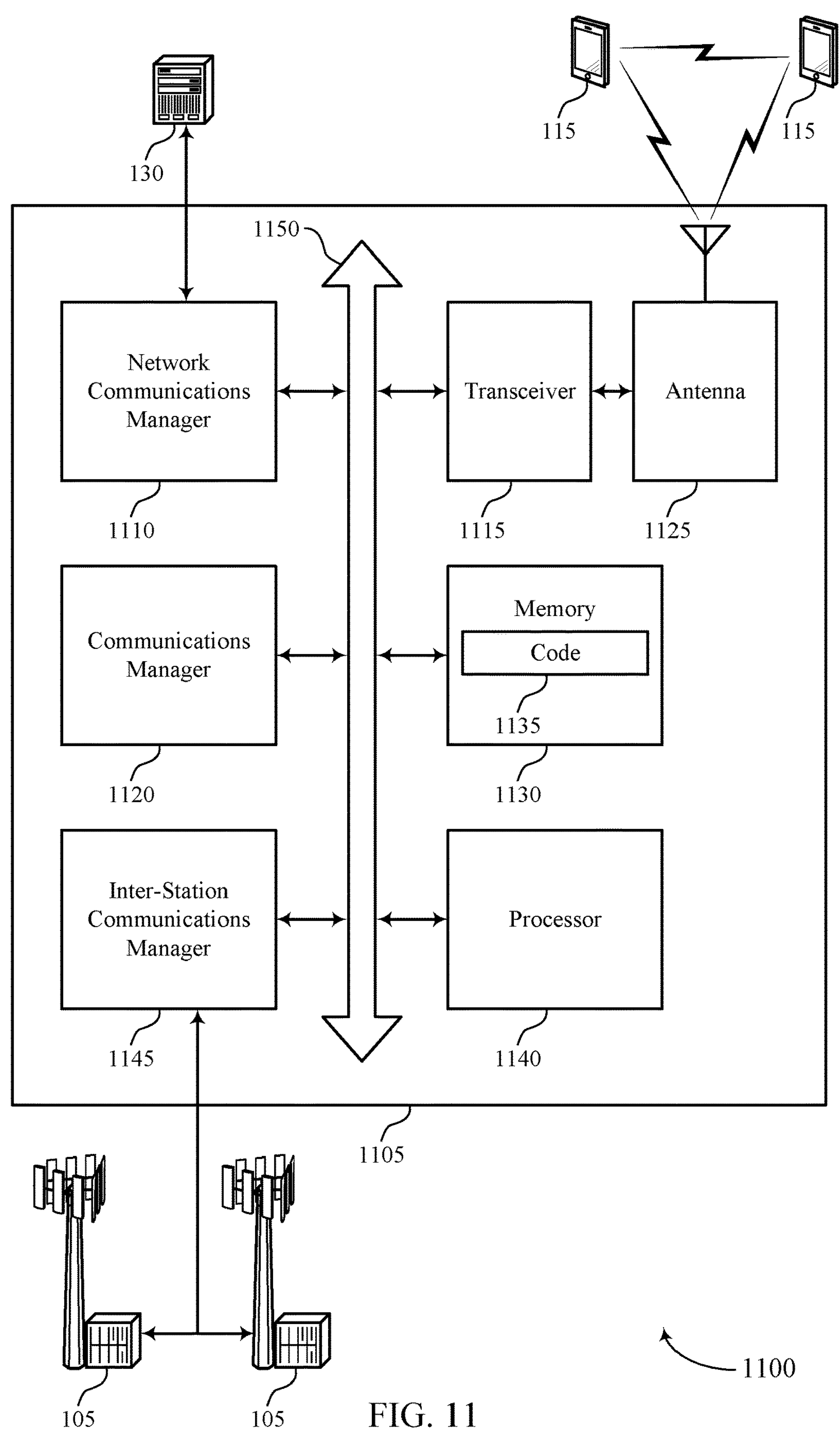
FIG. 11 shows a diagram of a system including a device that supports techniques for surrounding information indication in accordance with aspects of the present disclosure.

FIG. 11 shows a diagram of a system 1100 including a device 1105 that supports techniques for surrounding information indication in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for surrounding information indication). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for receiving, via a sensor included within the base station, information associated with a surrounding in which a UE is located. The communications manager 1120 may be configured as or otherwise support a means for transmitting, to the UE, an indication of the information associated with the surrounding in which the UE is located based on the receiving. The communications manager 1120 may be configured as or otherwise support a means for performing a communication procedure with the UE based on transmitting the indication of the information associated with the surrounding in which the UE is located.

By including or configuring the communications manager 1120 in accordance with examples as described herein, the device 1105 may support techniques for improved communication reliability, reduced latency, improved user experience related to reduced processing, and more efficient utilization of communication resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for surrounding information indication as described herein, or the processor 1140 and the memory 1130 may be otherwise configured to perform or support such operations.

Figure 12:
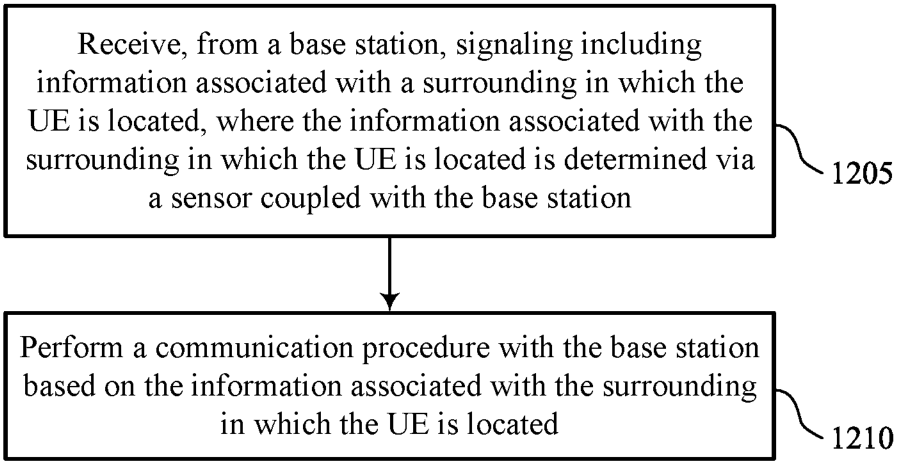
FIGS. 12 through 15 show flowcharts illustrating methods that support techniques for surrounding information indication in accordance with aspects of the present disclosure.

FIG. 12 shows a flowchart illustrating a method 1200 that supports techniques for surrounding information indication in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, signaling including information associated with a surrounding in which the UE is located, where the information associated with the surrounding in which the UE is located is determined via a sensor coupled with the base station. The operations of 1205 may be performed in accordance with examples as disclosed herein. In some examples, aspects of the operations of 1205 may be performed by a signal reception component 625 as described with reference to FIG. 6.

At 1210, the method may include performing a communication procedure with the base station based on the information associated with the surrounding in which the UE is located. The operations of 1210 may be performed in accordance with examples as disclosed herein. In some examples, aspects of the operations of 1210 may be performed by a communication component 630 as described with reference to FIG. 6.

Figure 13:
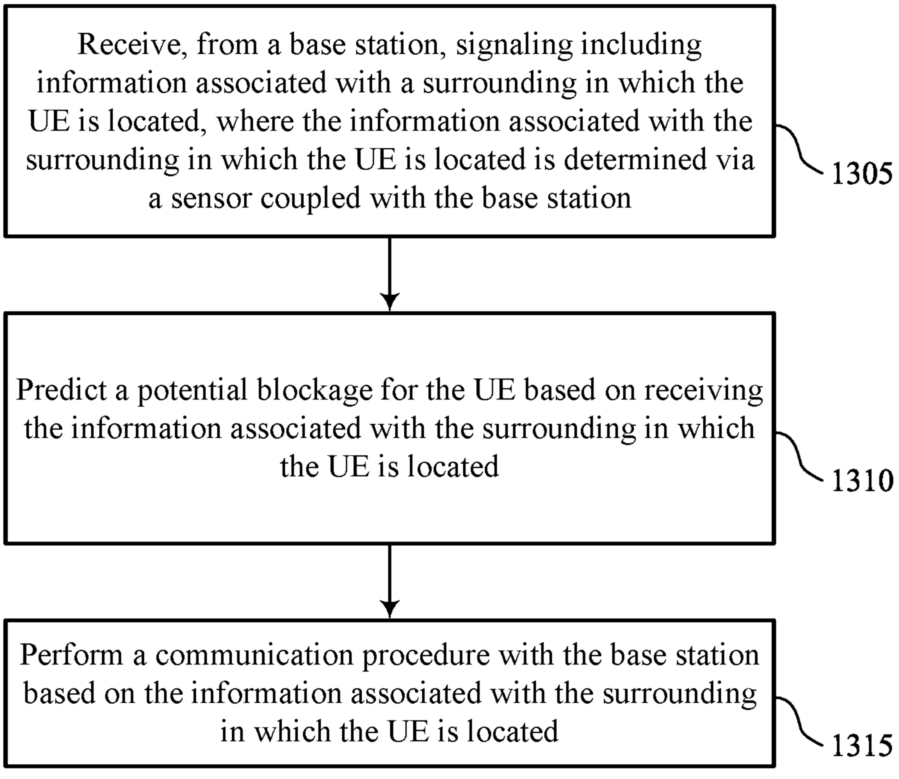

FIG. 13 shows a flowchart illustrating a method 1300 that supports techniques for surrounding information indication in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, signaling including information associated with a surrounding in which the UE is located, where the information associated with the surrounding in which the UE is located is determined via a sensor coupled with the base station. The operations of 1305 may be performed in accordance with examples as disclosed herein. In some examples, aspects of the operations of 1305 may be performed by a signal reception component 625 as described with reference to FIG. 6.

At 1310, the method may include predicting a potential blockage for the UE based on receiving the information associated with the surrounding in which the UE is located. The operations of 1310 may be performed in accordance with examples as disclosed herein. In some examples, aspects of the operations of 1310 may be performed by a blockage prediction component 640 as described with reference to FIG. 6.

At 1315, the method may include performing a communication procedure with the base station based on the information associated with the surrounding in which the UE is located. In some examples, the communication procedure is based on predicting the potential blockage. The operations of 1315 may be performed in accordance with examples as disclosed herein. In some examples, aspects of the operations of 1315 may be performed by a communication component 630 as described with reference to FIG. 6.

Figure 14:
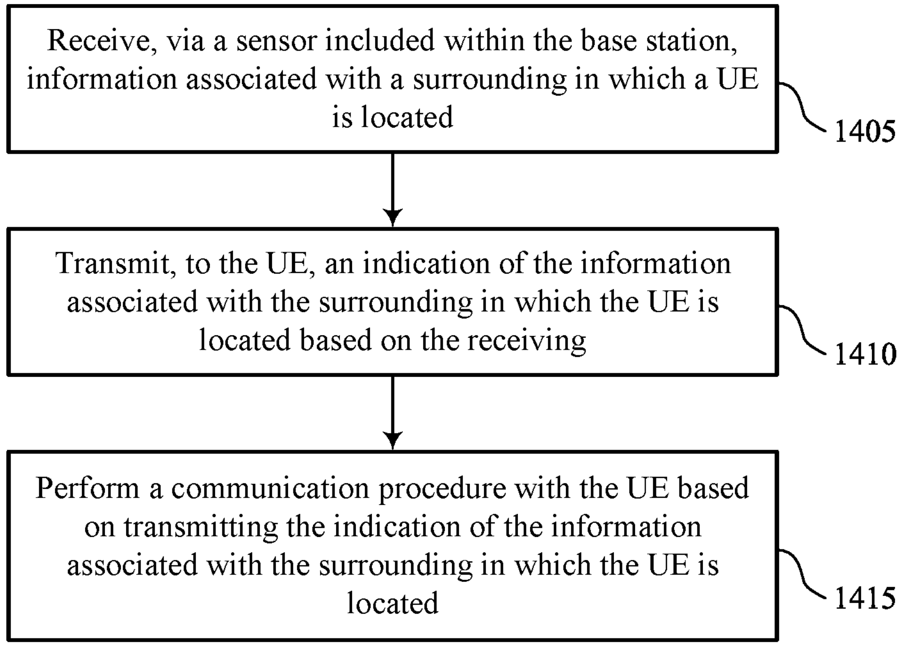

FIG. 14 shows a flowchart illustrating a method 1400 that supports techniques for surrounding information indication in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include receiving, via a sensor included within the base station, information associated with a surrounding in which a UE is located. The operations of 1405 may be performed in accordance with examples as disclosed herein. In some examples, aspects of the operations of 1405 may be performed by a surrounding information component 1025 as described with reference to FIG. 10.

At 1410, the method may include transmitting, to the UE, an indication of the information associated with the surrounding in which the UE is located based on the receiving. The operations of 1410 may be performed in accordance with examples as disclosed herein. In some examples, aspects of the operations of 1410 may be performed by a signal transmission component 1030 as described with reference to FIG. 10.

At 1415, the method may include performing a communication procedure with the UE based on transmitting the indication of the information associated with the surrounding in which the UE is located. The operations of 1415 may be performed in accordance with examples as disclosed herein. In some examples, aspects of the operations of 1415 may be performed by a communication component 1035 as described with reference to FIG. 10.

Figure 15:
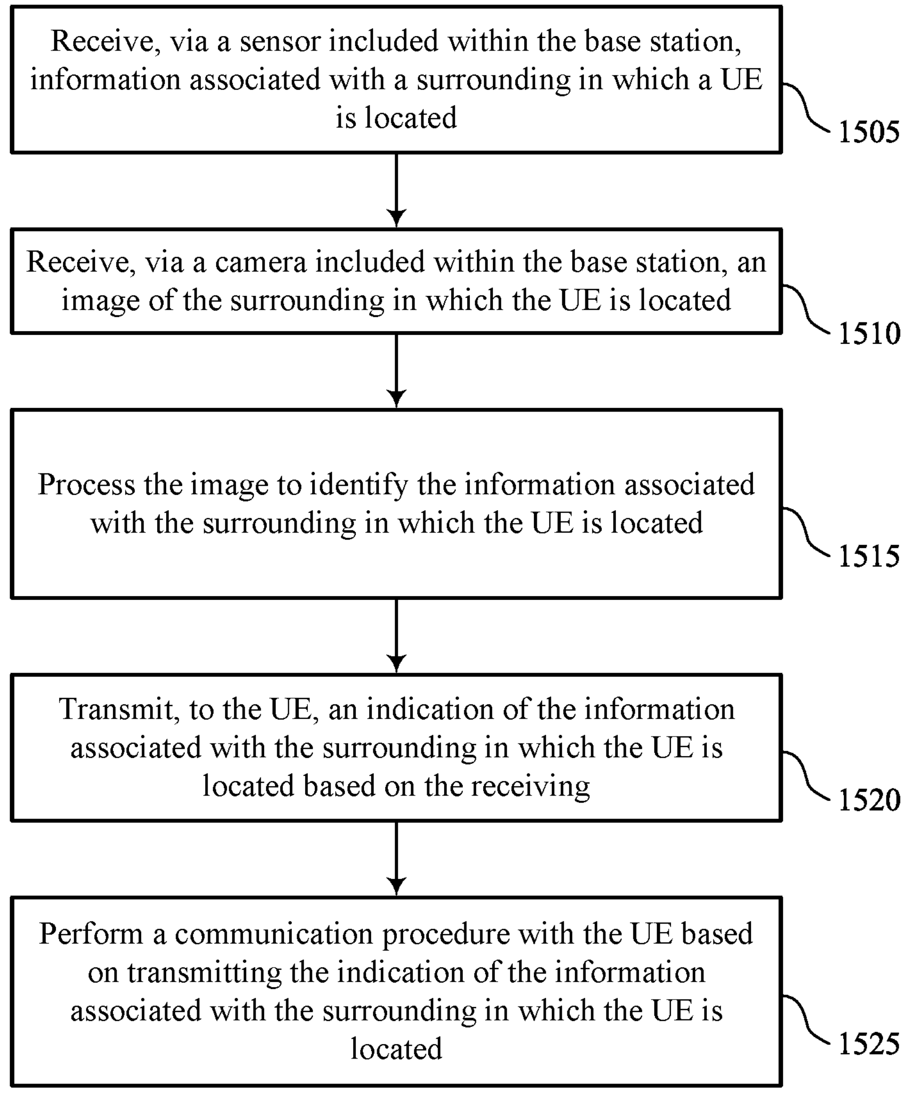

FIG. 15 shows a flowchart illustrating a method 1500 that supports techniques for surrounding information indication in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving, via a sensor included within the base station, information associated with a surrounding in which a UE is located. The operations of 1505 may be performed in accordance with examples as disclosed herein. In some examples, aspects of the operations of 1505 may be performed by a surrounding information component 1025 as described with reference to FIG. 10.

At 1510, the method may include receiving, via a camera included within the base station, an image of the surrounding in which the UE is located. The operations of 1510 may be performed in accordance with examples as disclosed herein. In some examples, aspects of the operations of 1510 may be performed by an image processing component 1040 as described with reference to FIG. 10.

At 1515, the method may include processing the image to identify the information associated with the surrounding in which the UE is located. The operations of 1515 may be performed in accordance with examples as disclosed herein. In some examples, aspects of the operations of 1515 may be performed by an image processing component 1040 as described with reference to FIG. 10.

At 1520, the method may include transmitting, to the UE, an indication of the information associated with the surrounding in which the UE is located based on the receiving. In some examples, transmitting the indication is based on processing the image. The operations of 1520 may be performed in accordance with examples as disclosed herein. In some examples, aspects of the operations of 1520 may be performed by a signal transmission component 1030 as described with reference to FIG. 10.

At 1525, the method may include performing a communication procedure with the UE based on transmitting the indication of the information associated with the surrounding in which the UE is located. The operations of 1525 may be performed in accordance with examples as disclosed herein. In some examples, aspects of the operations of 1525 may be performed by a communication component 1035 as described with reference to FIG. 10.

The following provides an overview of aspects of the present disclosure:

Aspect 1: A method for wireless communication at a UE, comprising: receiving, from a base station, signaling comprising information associated with a surrounding in which the UE is located, wherein the information associated with the surrounding in which the UE is located is determined via a sensor coupled with the base station; and performing a communication procedure with the base station based at least in part on the information associated with the surrounding in which the UE is located.

Aspect 2: The method of aspect 1, wherein receiving the information further comprises: receiving one or more environmental parameters comprising at least one of UE position information, a time of day, a number of connected UEs at the base station, or a combination thereof, wherein the communication procedure is based at least in part on the one or more environmental parameters.

Aspect 3: The method of any of aspects 1 through 2, further comprising: predicting a potential blockage for the UE based at least in part on receiving the information associated with the surrounding in which the UE is located, wherein the communication procedure is based at least in part on predicting the potential blockage.

Aspect 4: The method of any of aspects 1 through 3, further comprising: identifying a deployment information associated with the UE based at least in part on receiving the information associated with the surrounding in which the UE is located, wherein the communication procedure is based at least in part on the deployment information.

Aspect 5: The method of aspect 4, wherein the deployment information comprises at least one of an urban microcell deployment, an urban macrocell deployment, an inhouse deployment, or a combination thereof.

Aspect 6: The method of any of aspects 1 through 5, further comprising: predicting that the UE is on a trajectory to transition into an indoor setting based at least in part on receiving the information associated with the surrounding in which the UE is located, wherein the communication procedure is based at least in part on predicting that the UE is on the trajectory to transition into the indoor setting.

Aspect 7: The method of any of aspects 1 through 6, further comprising: determining a crowd level at the surrounding based at least in part on receiving the information associated with the surrounding in which the UE is located, wherein the communication procedure comprises transmitting an adjusted measurement report based at least in part on the crowd level at the surrounding.

Aspect 8: The method of any of aspects 1 through 7, further comprising: detecting an object within the surrounding based at least in part on receiving the information associated with the surrounding in which the UE is located, wherein the communication procedure is based at least in part on the detected object.

Aspect 9: The method of any of aspects 1 through 8, wherein receiving the information further comprises: receiving, via a control signal, the information associated with the surrounding in which the UE is located.

Aspect 10: The method of aspect 9, wherein the control signal comprises at least one of a downlink control information, a medium access control layer control element, a radio resource control signal, or a combination thereof.

Aspect 11: The method of any of aspects 1 through 10, wherein the information indicates whether the UE is located indoors, outdoors, or indeterminate.

Aspect 12: A method for wireless communication at a base station, comprising: receiving, via a sensor included within the base station, information associated with a surrounding in which a UE is located; transmitting, to the UE, an indication of the information associated with the surrounding in which the UE is located based at least in part on the receiving; and performing a communication procedure with the UE based at least in part on transmitting the indication of the information associated with the surrounding in which the UE is located.

Aspect 13: The method of aspect 12, further comprising: receiving, via a camera included within the base station, an image of the surrounding in which the UE is located; and processing the image to identify the information associated with the surrounding in which the UE is located, wherein transmitting the indication is based at least in part on processing the image.

Aspect 14: The method of any of aspects 12 through 13, further comprising: receiving, via the sensor included within the base station, one or more environmental parameters comprising at least one of UE position information, a time of day, a number of connected UEs at the base station, or a combination thereof; and identifying the information associated with the surrounding in which the UE is located based at least in part on receiving the one or more environmental parameters.

Aspect 15: The method of any of aspects 12 through 14, further comprising: determining historical data associated with the surrounding in which the UE is located; and identifying the information associated with the surrounding in which the UE is located based at least in part on the historical data.

Aspect 16: The method of any of aspects 12 through 15, further comprising: predicting a potential blockage for the UE based at least in part on receiving the information associated with the surrounding in which the UE is located, wherein transmitting the indication is based at least in part on predicting the potential blockage.

Aspect 17: The method of any of aspects 12 through 16, further comprising: identifying a deployment information associated with the UE based at least in part on receiving the information associated with the surrounding in which the UE is located, wherein transmitting the indication is based at least in part on the deployment information.

Aspect 18: The method of aspect 17, wherein the deployment information comprises at least one of an urban microcell deployment, an urban macrocell deployment, an inhouse deployment, or a combination thereof.

Aspect 19: The method of any of aspects 12 through 18, further comprising: predicting that the UE is on a trajectory to transition into an indoor setting based at least in part on receiving the information associated with the surrounding in which the UE is located, wherein transmitting the indication is based at least in part on predicting that the UE is on the trajectory to transition into the indoor setting.

Aspect 20: The method of any of aspects 12 through 19, further comprising: determining a crowd level at the surrounding based at least in part on receiving the information associated with the surrounding in which the UE is located, wherein transmitting the indication comprises transmitting an indication of the crowd level at the surrounding.

Aspect 21: The method of any of aspects 12 through 20, further comprising: detecting an object within the surrounding based at least in part on receiving the information associated with the surrounding in which the UE is located, wherein transmitting the indication comprises transmitting an indication of the detected object.

Aspect 22: The method of any of aspects 12 through 21, wherein transmitting the indication further comprises: transmitting, via a control signal, the indication of the information associated with the surrounding in which the UE is located.

Aspect 23: The method of aspect 22, wherein the control signal comprises at least one of a downlink control information, a medium access control layer control element, a radio resource control signal, or a combination thereof.

Aspect 24: The method of any of aspects 12 through 23, wherein the indication indicates whether the UE is located indoors, outdoors, or indeterminate.

Aspect 25: An apparatus for wireless communication at a UE, comprising a processor; memory coupled with the processor; and instructions stored in the memory and executable by the processor to cause the apparatus to perform a method of any of aspects 1 through 11.

Aspect 26: An apparatus for wireless communication at a UE, comprising at least one means for performing a method of any of aspects 1 through 11.

Aspect 27: A non-transitory computer-readable medium storing code for wireless communication at a UE, the code comprising instructions executable by a processor to perform a method of any of aspects 1 through 11.

Aspect 28: An apparatus for wireless communication at a base station, comprising a processor; memory coupled with the processor; and instructions stored in the memory and executable by the processor to cause the apparatus to perform a method of any of aspects 12 through 24.

Aspect 29: An apparatus for wireless communication at a base station, comprising at least one means for performing a method of any of aspects 12 through 24.

Aspect 30: A non-transitory computer-readable medium storing code for wireless communication at a base station, the code comprising instructions executable by a processor to perform a method of any of aspects 12 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, from a network entity, signaling comprising information associated with a surrounding in which the UE is located and one or more environmental parameters comprising at least one of UE position information, a quantity of connected UEs at the network entity, or both, wherein the information associated with the surrounding in which the UE is located is determined via a sensor coupled with the network entity;

predicting, by the UE, that the UE is on a trajectory to transition into an indoor setting based at least in part on the information associated with the surrounding in which the UE is located, wherein the indoor setting is associated with one or more objects associated with the surrounding;

predicting, by the UE and based at least in part on the predicting that the UE is on the trajectory to transition into the indoor setting, a potential physical object blockage of a communication link between the network entity and the UE based at least in part on the information associated with the surrounding in which the UE is located and on the one or more objects associated with the trajectory of the UE; and performing, by the UE, a communication procedure with the network entity based at least in part on the predicting that the UE is on the trajectory to transition into the indoor setting, based at least in part on the predicting the potential physical object blockage, and based at least in part on the one or more environmental parameters.

2. The method of claim 1, wherein:

the one or more environmental parameters further comprises a time of day.

3. The method of claim 1, further comprising:

identifying a deployment information associated with the UE based at least in part on receiving the information associated with the surrounding in which the UE is located, wherein the communication procedure is based at least in part on the deployment information.

4. The method of claim 3, wherein the deployment information comprises at least one of an urban microcell deployment, an urban macrocell deployment, an inhouse deployment, or a combination thereof.

5. The method of claim 1, further comprising:

determining a crowd level at the surrounding based at least in part on receiving the information associated with the surrounding in which the UE is located, wherein the communication procedure comprises transmitting an adjusted measurement report based at least in part on the crowd level at the surrounding and wherein the crowd level is associated with the one or more objects associated with the surrounding.

6. The method of claim 1, further comprising:

detecting an object of the one or more objects, the object within the surrounding, based at least in part on receiving the information associated with the surrounding in which the UE is located, wherein the communication procedure is based at least in part on the detected object.

7. The method of claim 1, wherein receiving the information further comprises:

receiving, via a control signal, the information associated with the surrounding in which the UE is located.

8. The method of claim 7, wherein the control signal comprises at least one of a downlink control information, a medium access control layer control element, a radio resource control signal, or a combination thereof.

9. The method of claim 1, wherein the information indicates whether the UE is located indoors, outdoors, or indeterminate.

10. A method for wireless communication at a network entity, comprising:

receiving, via a sensor included within the network entity, information associated with a surrounding in which a user equipment (UE) is located;

predicting, by the network entity, that the UE is on a trajectory to transition into an indoor setting based at least in part on the information associated with the surrounding in which the UE is located, wherein the indoor setting is associated with one or more objects associated with the surrounding;

predicting, by the network entity and based at least in part on the predicting that the UE is on the trajectory to transition into the indoor setting, a potential physical object blockage of a communication link between the network entity and the UE based at least in part on the information associated with the surrounding in which the UE is located and on the one or more objects associated with the trajectory of the UE;

transmitting, to the UE, signaling indicating the information associated with the surrounding in which the UE is located based at least in part on the predicting the potential physical object blockage and indicating one or more environmental parameters comprising at least one of UE position information, a quantity of connected UEs at the network entity, or both; and performing, by the network entity, a communication procedure with the UE based at least in part on the predicting that the UE is on the trajectory to transition into the indoor setting, based at least in part on transmitting the signaling indicating the information associated with the surrounding in which the UE is located, and based at least in part on the one or more environmental parameters.

11. The method of claim 10, further comprising:

receiving, via a camera included within the network entity, an image of the surrounding in which the UE is located; and processing the image to identify the information associated with the surrounding in which the UE is located, wherein transmitting the signaling is based at least in part on processing the image.

12. The method of claim 10, further comprising:

receiving, via the sensor included within the network entity, the one or more environmental parameters comprising at least one of the UE position information, a time of day, the quantity of connected UEs at the network entity, or a combination thereof; and identifying the information associated with the surrounding in which the UE is located based at least in part on receiving the one or more environmental parameters.

13. The method of claim 10, further comprising:

determining historical data associated with the surrounding in which the UE is located; and identifying the information associated with the surrounding in which the UE is located based at least in part on the historical data.

14. The method of claim 10, further comprising:

identifying a deployment information associated with the UE based at least in part on receiving the information associated with the surrounding in which the UE is located, wherein transmitting the signaling is based at least in part on the deployment information.

15. The method of claim 14, wherein the deployment information comprises at least one of an urban microcell deployment, an urban macrocell deployment, an inhouse deployment, or a combination thereof.

16. The method of claim 10, further comprising:

determining a crowd level at the surrounding based at least in part on receiving the information associated with the surrounding in which the UE is located, wherein transmitting the signaling comprises transmitting an indication of the crowd level at the surrounding and wherein the crowd level is associated with the one or more objects associated with the surrounding.

17. The method of claim 10, further comprising:

detecting an object of the one or more objects, the object within the surrounding based at least in part on receiving the information associated with the surrounding in which the UE is located, wherein transmitting the signaling comprises transmitting an indication of the detected object.

18. The method of claim 10, wherein transmitting the signaling further comprises:

transmitting, via a control signal, an indication of the information associated with the surrounding in which the UE is located.

19. The method of claim 18, wherein the control signal comprises at least one of a downlink control information, a medium access control layer control element, a radio resource control signal, or a combination thereof.

20. The method of claim 10, wherein the signaling indicates whether the UE is located indoors, outdoors, or indeterminate.

21. A user equipment (UE), comprising:

one or more memories storing processor-executable code; and one or more processors coupled with the one or more memories and individually or collectively operable to execute the code to cause the UE to:

receive, from a network entity, signaling comprising information associated with a surrounding in which the UE is located and one or more environmental parameters comprising at least one of UE position information, a quantity of connected UEs at the network entity, or both, wherein the information associated with the surrounding in which the UE is located is determined via a sensor coupled with the network entity;

predict, by the UE, that the UE is on a trajectory to transition into an indoor setting based at least in part on the information associated with the surrounding in which the UE is located, wherein the indoor setting is associated with one or more objects associated with the surrounding;

predict, by the UE and based at least in part on prediction that the UE is on the trajectory to transition into the indoor setting, a potential physical object blockage of a communication link between the network entity and the UE based at least in part on the information associated with the surrounding in which the UE is located and on the one or more objects associated with the trajectory of the UE; and perform, by the UE, a communication procedure with the network entity based at least in part on prediction that the UE is on the trajectory to transition into the indoor setting, based at least in part on prediction of the potential physical object blockage, and based at least in part on the one or more environmental parameters.

22. The UE of claim 21, wherein the one or more environmental parameters further comprises a time of day.

23. The UE of claim 21, wherein the one or more processors are individually or collectively further operable to execute the code to cause the UE to:

identify a deployment information associated with the UE based at least in part on receiving the information associated with the surrounding in which the UE is located, wherein the communication procedure is based at least in part on the deployment information.

24. A network entity, comprising:

one or more memories storing processor-executable code; and one or more processors coupled with the one or more memories and individually or collectively operable to execute the code to cause the network entity to:

receive, via a sensor included within the network entity, information associated with a surrounding in which a user equipment (UE) is located;

predict that a trajectory of the UE is to transition into an indoor setting based at least in part on the information associated with the surrounding in which the UE is located, wherein the indoor setting is associated with one or more objects associated with the surrounding;

predict, by the network entity and based at least in part on prediction that the UE is on the trajectory to transition into the indoor setting, a potential physical object blockage of a communication link between the network entity and the UE based at least in part on the information associated with the surrounding in which the UE is located and on the one or more objects associated with the trajectory of the UE;

transmit, to the UE, signaling indicating the information associated with the surrounding in which the UE is located based at least in part on the predicting the potential physical object blockage and indicating one or more environmental parameters comprising at least one of UE position information, a quantity of connected UEs at the network entity, or both; and perform, by the network entity, a communication procedure with the UE based at least in part on prediction that the UE is on the trajectory to transition into the indoor setting, based at least in part on transmitting the signaling indicating the information associated with the surrounding in which the UE is located, and based at least in part on the one or more environmental parameters.

25. The network entity of claim 24, wherein the one or more processors are individually or collectively further operable to execute the code to cause the network entity to:

receive, via a camera included within the network entity, an image of the surrounding in which the UE is located; and process the image to identify the information associated with the surrounding in which the UE is located, wherein transmitting the signaling is based at least in part on processing the image.

* * * * *